(12) United States Patent
Murase et al.

(10) Patent No.: US 8,917,781 B2
(45) Date of Patent: Dec. 23, 2014

(54) POWER LINE COMMUNICATION SYSTEM

(71) Applicant: DENSO CORPORATION, Kariya, Aichi-pref. (JP)

(72) Inventors: Yuukou Murase, Nagoya (JP); Fan Wang, Nagoya (JP); Yoshie Sugiura, Nagoya (JP); Akira Takaoka, Okazaki (JP)

(73) Assignee: DENSO CORPORATION, Kariya (JP)

( * ) Notice: Subject to any disclaimer, the term of this patent is extended or adjusted under 35 U.S.C. 154(b) by 111 days.

(21) Appl. No.: 13/726,710

(22) Filed: Dec. 26, 2012

(65) Prior Publication Data

US 2013/0169421 A1 Jul. 4, 2013

(30) Foreign Application Priority Data

Dec. 27, 2011 (JP) ................................. 2011-285492

(51) Int. Cl.
*H04B 3/00* (2006.01)
*G08C 19/12* (2006.01)
*H04L 12/40* (2006.01)
*H04B 3/54* (2006.01)
*H04L 12/46* (2006.01)

(52) U.S. Cl.
CPC .......... *G08C 19/12* (2013.01); *H04L 12/40045* (2013.01); *H04B 3/542* (2013.01); *H04B 3/548* (2013.01); *H04L 12/4645* (2013.01)
USPC ...................................................... 375/257

(58) Field of Classification Search
CPC ........ G05B 11/01; G08C 19/12; G08C 19/16; G06F 7/00; H04B 1/00; H04B 3/02; H04B 3/08; H04B 3/46; H04B 3/54; H04B 3/548; H04B 3/56; H04B 3/57; H04B 3/58; H04B 5/00; H02J 7/00; H02J 17/00; H04J 11/00; H04M 11/04; H04L 12/40; H04L 27/00

USPC .................. 320/109, 137; 333/12; 340/12.32, 340/13.23, 310.01, 310.02, 310.07, 310.11, 340/310.15, 415.1, 425.5, 538; 370/208, 370/210, 344, 437, 480; 375/219, 222, 224, 375/257–260, 295; 701/1, 2, 49
See application file for complete search history.

(56) References Cited

U.S. PATENT DOCUMENTS 5,148,144 A * 9/1992 Sutterlin et al. .............. 455/402
6,321,067 B1 11/2001 Suga et al.
(Continued)

FOREIGN PATENT DOCUMENTS

JP A-H03-289302 12/1991
JP 8-221528 A 8/1996
(Continued)

OTHER PUBLICATIONS

Office Action mailed Nov. 26, 2013 issued in corresponding JP patent application No. 2011-285492 (and English translation).

*Primary Examiner* — Jaison Joseph
*Assistant Examiner* — Shawkat M Ali
(74) *Attorney, Agent, or Firm* — Posz Law Group, PLC

(57) ABSTRACT

A vehicular power line communication system includes a looped twisted pair wire, a master, and a slave. The master outputs a high-frequency signal to the twisted pair wire to transmit power and a signal. The slave includes a looped aperture antenna that receives high-frequency power of the twisted pair wire and a received power measurement portion that monitors received power received at the aperture antenna. The aperture antenna includes an aperture region facing an aperture region between twisted portions of the twisted pair wire.

11 Claims, 9 Drawing Sheets

(56) References Cited

U.S. PATENT DOCUMENTS

| | | |
|---|---|---|
| 6,496,314 B1 | 12/2002 | Ota et al. |
| 7,852,206 B2 * | 12/2010 | Yanagida et al. ............. 340/538 |
| 8,353,903 B2 * | 1/2013 | Podhajsky ..................... 606/33 |
| 2001/0028678 A1 | 10/2001 | Kato et al. |
| 2004/0155720 A1 * | 8/2004 | Yasui et al. .................... 333/12 |
| 2006/0224278 A1 * | 10/2006 | Yanagida et al. ................. 701/1 |
| 2008/0310492 A1 * | 12/2008 | Kasai et al. ................... 375/232 |
| 2011/0307123 A1 * | 12/2011 | Abe et al. ......................... 701/2 |
| 2012/0146776 A1 * | 6/2012 | Eguchi ...................... 340/12.32 |

FOREIGN PATENT DOCUMENTS

| | | |
|---|---|---|
| JP | 10-210040 A | 8/1998 |
| JP | A-2005-45327 | 2/2005 |
| JP | A-2005-303632 | 10/2005 |
| JP | A-2006-352849 | 12/2006 |
| JP | A-2008-17185 | 1/2008 |
| JP | 2010-283737 A | 12/2010 |
| JP | A-2013-026831 | 2/2013 |
| WO | 2004/054179 A1 | 6/2004 |

* cited by examiner

HIGH FREQUENCY
· SIGNAL ⇒
· POWER

HIGH FREQUENCY
· SIGNAL ⇒
· POWER

HIGH FREQUENCY
· SIGNAL ⇒
· POWER

HIGH FREQUENCY
· SIGNAL ⇒
· POWER

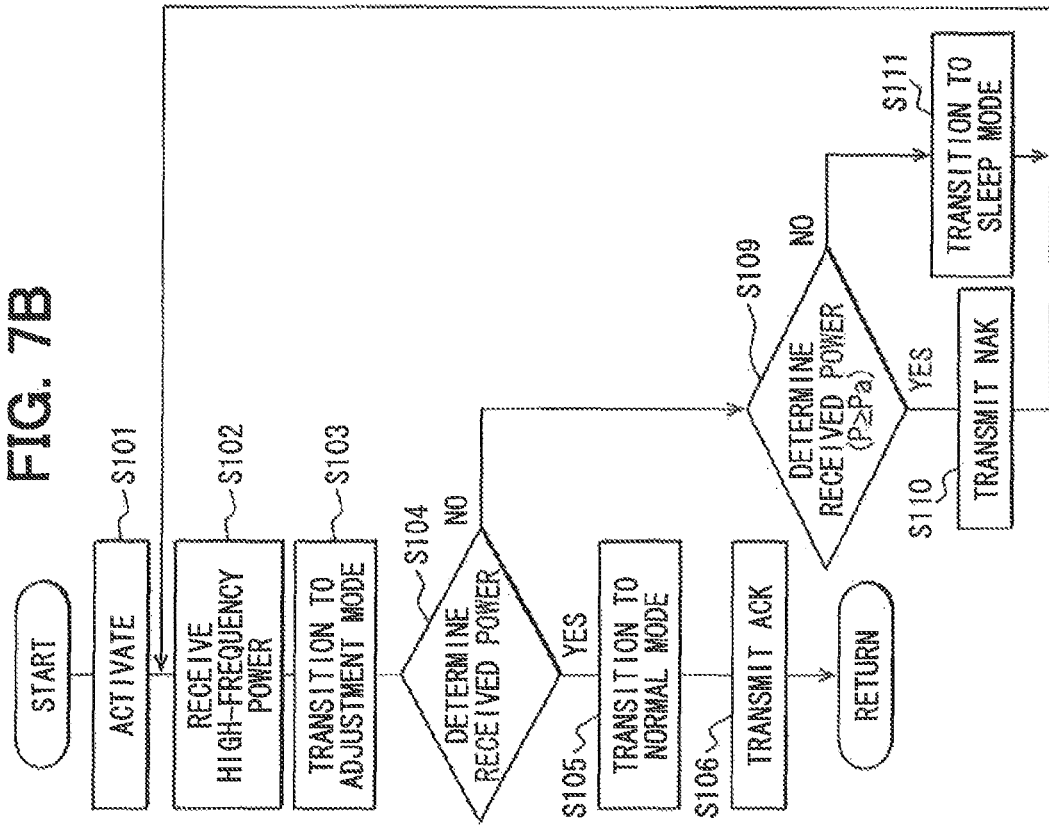
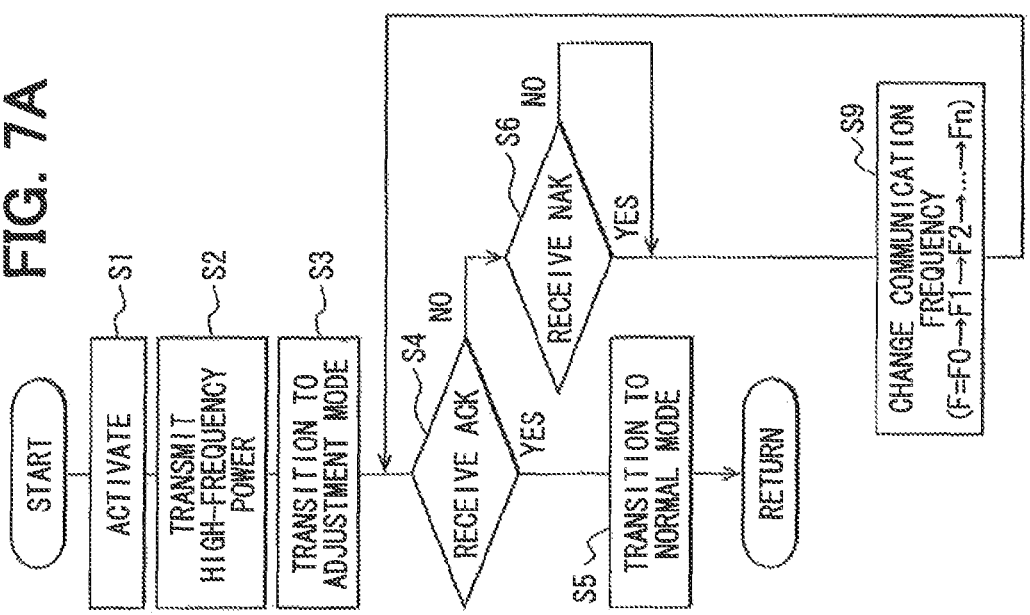

POWER LINE COMMUNICATION SYSTEM

CROSS REFERENCE TO RELATED APPLICATIONS

The present application is based on and claims priority to Japanese Patent Application No. 2011-285492 filed on Dec. 27, 2011, the contents of which are incorporated in their entirety herein by reference.

TECHNICAL FIELD

The present disclosure relates to a vehicular power line communication system that allows a plurality of communication apparatuses to communicate with each other using a power line.

BACKGROUND

A plurality of electronic control units (ECU) is provided in a vehicle and communicates with each other to smoothly ensure various controls in the vehicle. For this purpose, a power line communication (PLC) system may be employed. The power line communication system embodies a technology that transmits signals by superposing them on high-frequency carriers for communication.

JP-A-2005-45327 discloses an example of the technology. According to the technology, a balanced feed line including two parallel lines is attached to a mobile object near a loop-formed coupler. This enables electromagnetic induction coupling between the mobile object and the balanced feed line.

However, the inventors have made it clear that the electric power or signal communication using electromagnetic induction coupling according to the conventional technology generates much leakage magnetic flux at portions other than a coupling portion where the electric power or signals are exchanged.

SUMMARY

It is an object of the invention to provide a vehicular power line communication system capable of power line communication, strengthening electromagnetic induction coupling at transmission and reception sides using a power line.

A vehicular power line communication system according to a first aspect of the present disclosure includes a twisted pair wire, a master, and a slave. The twisted pair wire is looped so that a core is connected at the end. The master uses the twisted pair wire as a power line and a communication line and outputs a high-frequency signal to the twisted pair wire to transmit power and a signal. The slave includes a looped aperture antenna and a received power measurement portion. The aperture antenna is looped and receives high-frequency power of the twisted pair wire through electromagnetic induction coupling of an electromagnetic field occurring at the twisted pair wire in accordance with an applied current of the twisted pair wire. The received power measurement portion monitors received power received at the aperture antenna. The aperture antenna includes an aperture region facing an aperture region between twisted portions of the twisted pair wire.

The vehicular power line communication system according to the first aspect can perform power line communication, strengthening the electromagnetic induction coupling.

A vehicular power line communication system according to a second aspect of the present disclosure includes a twisted pair wire, a master, and a slave. The master uses the loop coil as a power line and a communication line and outputs a high-frequency signal to the loop coil to transmit power and a signal. The slave includes an aperture antenna and a received power measurement portion. The aperture antenna is looped and receives high-frequency power of the loop coil through electromagnetic induction coupling of an electromagnetic field occurring at the loop coil in accordance with an applied current of the loop coil. The received power measurement portion monitors received power received at the aperture antenna. The loop coil is configured so that an aperture region facing an aperture region of the aperture antenna is larger than the other aperture regions.

The vehicular power line communication system according to the second aspect can perform power line communication, strengthening the electromagnetic induction coupling.

BRIEF DESCRIPTION OF THE DRAWINGS

Additional objects and advantages of the present disclosure will be more readily apparent from the following detailed description when taken together with the accompanying drawings. In the drawings:

FIG. 7A is a flowchart illustrating operation of a master in adjustment mode according to the second embodiment and FIG. 7B is a flowchart illustrating operation of a slave in adjustment mode according to the second embodiment;

DETAILED DESCRIPTION (First Embodiment)

Figure 1:
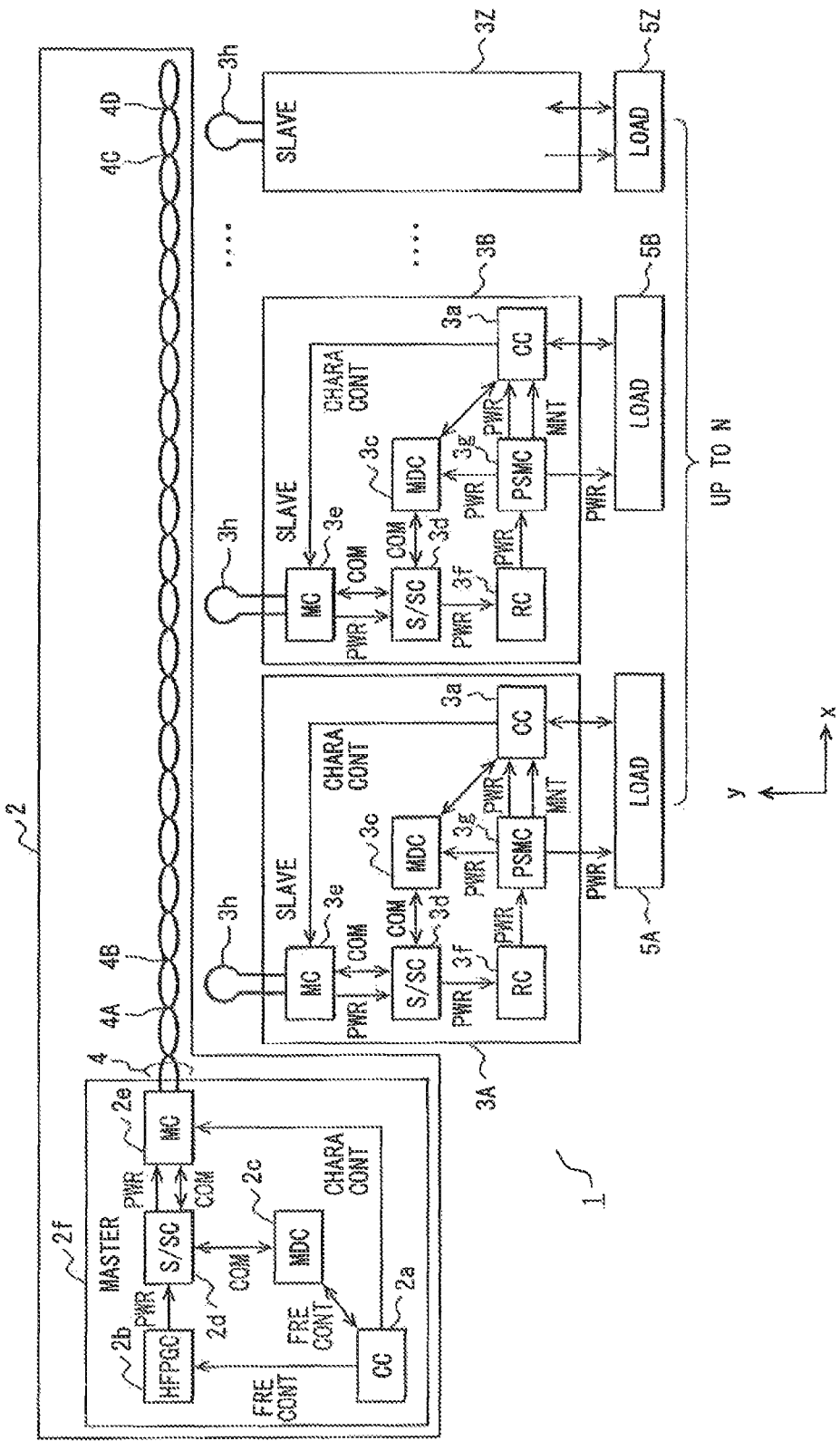
FIG. 1 is an electric configuration diagram illustrating a power line communication system according to a first embodiment of the present disclosure.

The following describes a vehicular power line communication system according to a first embodiment of the present disclosure with reference to FIGS. 1 through 5B.

The vehicular power line communication system 1 includes a master (master system) 2 and slaves (slave systems) 3A through 3Z. The master 2 connects with a battery (not shown). The master 2 supplies power of the battery (not shown) to the slaves 3A through 3Z via a power line. The slaves 3A through 3Z operate in accordance with the supplied power. The slaves 3A through 3Z connect with loads 5A through 5Z including sensors and actuators.

The master 2 includes a communication apparatus body (master body) 2f that further includes a control circuit 2a to control communication and other functions, a high-frequency power generation circuit 2b, a modulation and demodulation circuit 2c, a superposition/separation circuit 2d, and a matching circuit 2e. The communication apparatus body 2f connects with a twisted pair wire 4 used as a transmission antenna. The high-frequency power generation circuit 2b generates a high-frequency signal (carrier signal) according to a control signal from the control circuit 2a and outputs the generated signal as a power signal to the superposition/separation circuit 2d.

The modulation and demodulation circuit 2c modulates communication data at the master 2 and outputs the communication data as a modulation signal to the superposition/separation circuit 2d. The superposition/separation circuit 2d mixes the carrier signal and the modulation signal and outputs a mixed signal to the matching circuit 2e. The modulation signal is superposed on the carrier signal (power and signal as a high-frequency signal). The matching circuit 2e transmits the carrier signal to the twisted pair wire 4.

The control circuit 2a connects a control line to the matching circuit 2e to adjust and control impedance matching for the matching circuit 2e. The control circuit 2a connects the control line to the high-frequency power generation circuit 2b to control frequencies of a power signal output from the high-frequency power generation circuit 2b.

FIG. 2A through FIG. 2D illustrate circuit configuration examples of the matching circuit 2e in the master 2. As illustrated in FIG. 2A through FIG. 2D, the matching circuit 2e includes a transformer 2g and a variable capacitor 2h. The variable capacitor 2h is connected in series or parallel to primary and/or secondary side of the transformer 2g. Any circuit configuration may be applied to the matching circuit 2e if impedance matching is available.

Figure 3:
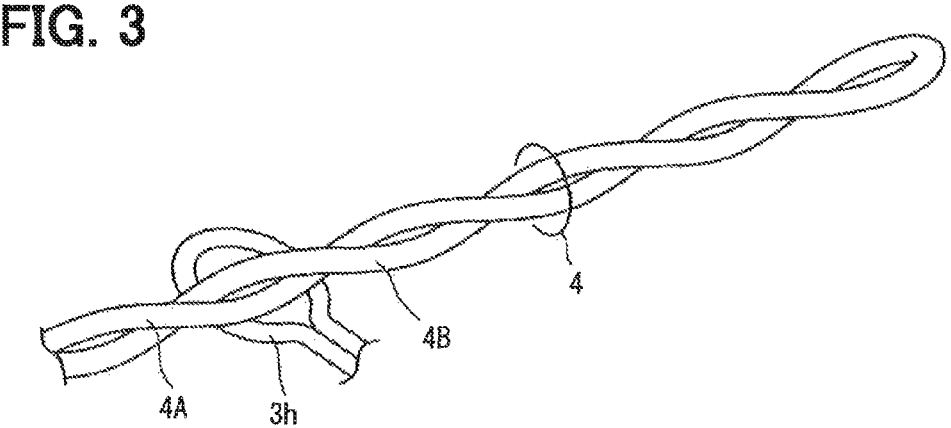
FIG. 3 is a perspective view illustrating a loop-formed twisted pair wire at which end a core is connected.

As illustrated in FIG. 3, the twisted wire 4 is installed in the vehicle and extends approximately 1 m from an output terminal of the body 2f to the farthest end. As illustrated in FIG. 1, the twisted pair wire 4 is looped so that its core is connected at the farthest end (end). The description of this application defines such a specially formed communication line with its end connected as the twisted pair wire 4 or the twisted wire 4 in a shortened form.

As illustrated in FIG. 1, each of the slaves 3A through 3Z includes a control circuit 3a, a modulation and demodulation circuit 3c, a superposition/separation circuit 3d, a matching circuit 3e, a rectifier circuit 3f, and a power supply monitor circuit 3g. The matching circuit 3e connects with an aperture antenna 3h for reception. The aperture antenna 3h is shaped into a loop such as a circle and receives an electromagnetic field generated from the twisted wire 4 according to electromagnetic induction coupling. Accordingly, using the aperture antenna 3h, the slaves 3A through 3Z can receive power and signals transmitted from the communication apparatus body 2f of the master 2.

Figure 2A:
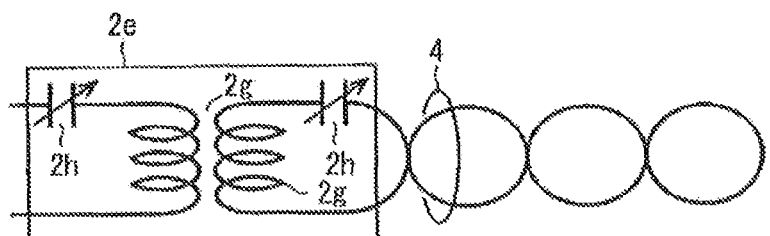
FIG. 2A through FIG. 2D illustrate circuit configuration examples of a master matching circuit and FIG. 2E and FIG. 2F illustrate circuit configuration examples of a slave matching circuit.
Figure 2B:
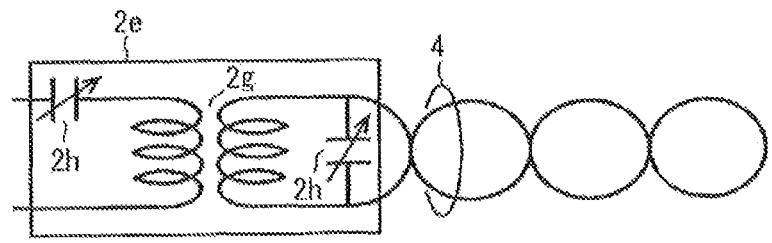
Figure 2C:
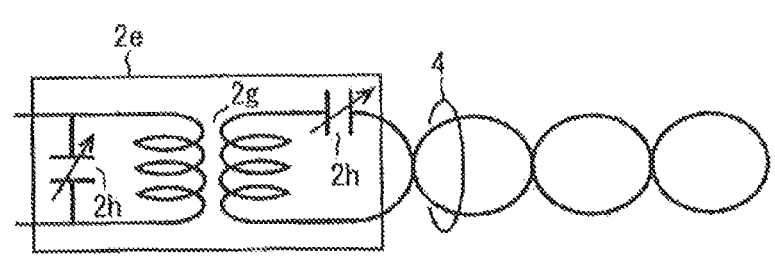
Figure 2D:
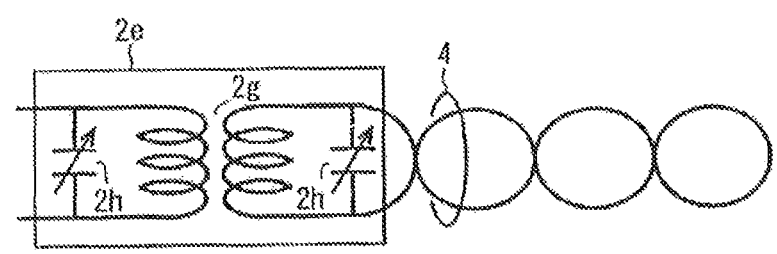
Figure 2E:
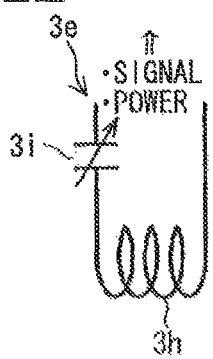
Figure 2F:
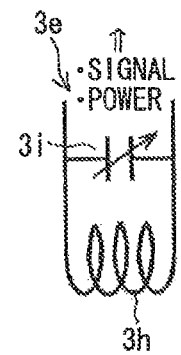

FIG. 2E and FIG. 2F illustrate circuit configuration examples of the matching circuit 3e in the slaves 3A through 3Z. As illustrated in FIG. 2E and FIG. 2F, the matching circuit 3e includes a variable capacitor 3i connected in parallel or series to the aperture antenna 3h. The matching circuit 3e provides impedance matching by varying a capacitance value of the variable capacitor 3l under control of the control circuit 3a.

The matching circuit 3e receives a carrier signal (power and signal) and transmits it to the superposition/separation circuit 3d. The superposition/separation circuit 3d separates the received carrier signal into a power AC signal and a communication data signal and transmits the power AC signal to the rectifier circuit 3f. The rectifier circuit 3f rectifies the power AC signal into DC power and supplies it to the power supply monitor circuit 3g. The power supply monitor circuit 3g monitors the supplied DC power. The power supply monitor circuit 3g can measure the received power received via the aperture antenna 3h by monitoring the DC power.

The power supply monitor circuit 3g also operates as a constant-voltage power supply circuit and supplies constant-voltage power to the modulation and demodulation circuit 3c, the control circuit 3a, and the load 5A. The modulation and demodulation circuit 3c operates on the supplied DC power, demodulates the communication data signal, and transmits the demodulated data to the control circuit 3a. The control circuit 3a operates on the power supplied from the power supply monitor circuit 3g, receives the demodulated data from the modulation and demodulation circuit 3c, and operates the load 5A. These operations are similarly performed on each of the slaves 3A through 3Z. The master 2 can thereby transmit communication data to the slaves 3A through 3Z.

On the other hand, the slaves 3A through 3Z transmit data to the master 2 as follows. The control circuit 3a for the slaves 3A through 3Z allows the modulation and demodulation circuit 3c to apply load modulation to data and transmit a modulation signal to the superposition/separation circuit 3d. The superposition/separation circuit 3d superposes the modulation signal from the modulation and demodulation circuit 3c on the carrier signal and outputs the carrier signal to the matching circuit 3e. The matching circuit 3e allows the aperture antenna 3h to output the carrier signal superposed with the modulation signal. The aperture antenna 3h outputs a radio signal.

The twisted wire 4 extends from the communication apparatus body 2f of the master 2 to the vicinity of the slaves 3A through 3Z as slaves for a twisted pair wire. The twisted wire 4 is equivalent to an unshielded twisted pair (UTP) cable having no shield. While the master 2 transmits a signal, the twisted pair wire 4 hardly outputs a noise to the outside. This is because an applied current due to the high-frequency signal generates a magnetic flux between adjacent twists (corresponding to twisted portions) such as 4A and 4B and adjacent magnetic fluxes reverse to balance each other. While the master 2 receives a signal, the twisted pair wire 4 is less likely to be influenced by radio waves arriving from the outside. This is because the twisted pair wire 4 causes a few flux linkage regions facing an external radio wave. Therefore, the twisted pair wire 4 can favorably restrict a noise from occurring and eliminate an external noise.

The twisted wire 4 includes many twists 4A, 4B, and so on. An aperture region between the twists 4A and 4B faces the aperture antenna 3h for the slave 3A. Though some reference numerals are omitted from FIG. 1, apertures between the twists similarly face the aperture antennas 3h for the slaves 3B through 3Z. For example, an aperture region between the twists 4C and 4D faces the aperture antenna 3h for the slave 3Z.

FIG. 1 illustrates that the aperture region of the aperture antenna 3h faces the aperture region (between twits 4A and 4B of the twisted wire 4) of the twisted wire 4 only in the x direction in order to easily understand the configuration of the twists 4A, 4B . . . , 4C, and 4D of the twisted wire 4. Actually, both aperture regions face to each other also in the y direction (see FIG. 3) so that they overlap with each other.

An electromagnetic field occurs at the aperture region between the twists 4A and 4B (4C and 4D) of the twisted wire 4 and intensely enables electromagnetic induction coupling with the aperture antenna 3h for each of the slaves 3A through 3Z. The aperture antenna 3h for each of the slaves 3A through 3Z can contactlessly and intensely receive the power and signals owing to the electromagnetic field that corresponds to the high-frequency signal and occurs at the aperture region between the twists 4A and 4B (4C and 4D) of the twisted wire 4. When the aperture antenna 3h transmits a signal, each of the slaves 3A through 3Z can contactlessly receive the signal via each aperture region between the twists (4A, 4B . . . , 4C, and 4D) of the twisted wire 4.

The master 2 may be configured so that only the aperture region between the twists 4A and 4B of the twisted wire 4 facing the aperture antenna 3h for the slaves 3A through 3Z is larger than the other aperture regions. This can favorably restrict a noise from occurring and eliminate an external noise and strengthen the electromagnetic induction coupling between the twisted wire 4 and the aperture antenna 3h.

Figure 4A:
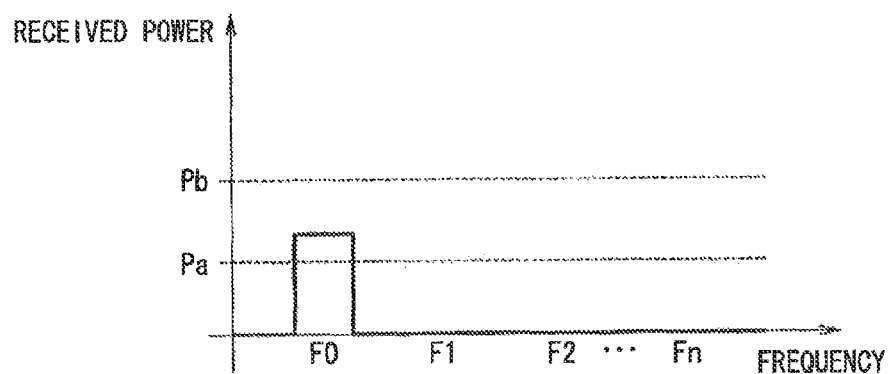
FIG. 4A and FIG. 4B illustrate reception power levels.
Figure 4B:
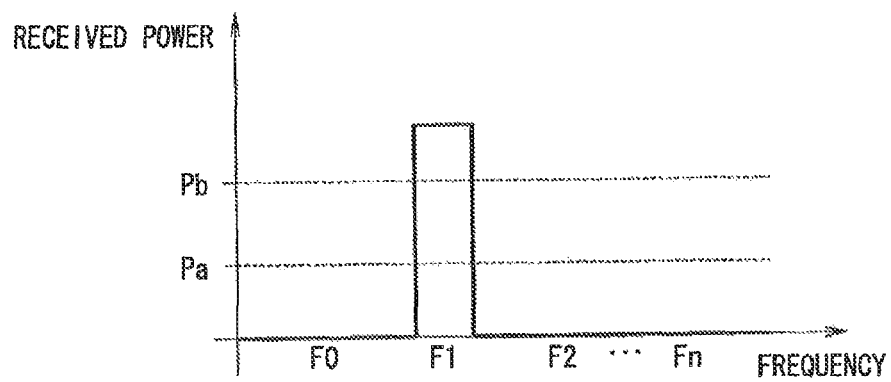

FIG. 4A and FIG. 4B illustrate reception power levels detected by the power supply monitor circuit. In FIG. 4A and FIG. 4B, Pa denotes the minimum power level allowing the slaves 3A through 3Z to operate and Pb denotes the minimum power level allowing the slaves 3A through 3Z to operate stably. If the received power is less than the predetermined level Pb, the matching circuit 2e may be configured to enable impedance matching with the twisted wire 4 or the matching circuit 3e may be configured to enable impedance matching with the aperture antenna 3h.

If the received power is lower than Pb, the frequency of the high-frequency signal output from the high-frequency power generation circuit 2b may be changed. Alternatively, the output power for the high-frequency signal may be increased. This can increase the received power for the slaves 3A through 3Z.

Figures 5A, 5B:
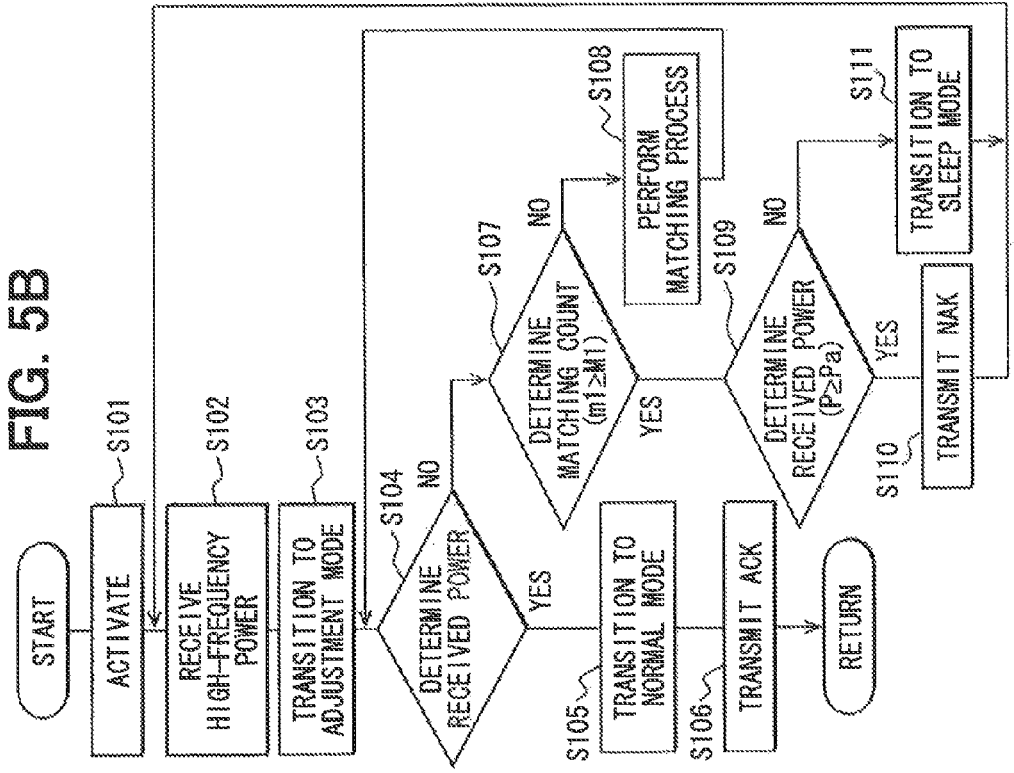
FIG. 5A is a flowchart illustrating operation of a master in adjustment mode according to the first embodiment and FIG. 5B is a flowchart illustrating operation of a slave in adjustment mode according to the first embodiment.

FIG. 5A is a flowchart illustrating operation of the master 2 in adjustment mode. FIG. 5B is a flowchart illustrating operation of each of the slaves 3A through 3Z in adjustment mode. In normal mode, the master 2 performs data communication with each of the slaves 3A through 3Z according to the power line communication. When started, the master 2 transitions to the adjustment mode and adjusts a communication frequency used for the power line communication or the power output from the master 2. In this case, the adjustment mode may use a communication speed lower than the normal mode. This can improve the reliability of data transmission and reception and enable more appropriate adjustment. In the adjustment mode, the slaves 3A through 3Z may cut power supply to the loads 5A through 5Z. Cutting power supply to the loads 5A through 5Z can furthermore improve the reliability of data transmission and reception in the adjustment mode.

The adjustment in the adjustment mode is performed between the master 2 and each of all the slaves 3A through 3Z. The normal power line communication process is performed after the master 2 has performed adjustment on each of all the slaves 3A through 3Z. The present embodiment features the adjustment method in the adjustment mode. This adjustment method will be described mainly. The following describes operation in the adjustment mode between the master 2 and the slave 3A. The adjustment between the master 2 and the other slaves 3B through 3Z is omitted.

When the master 2 is activated (S1), the high-frequency power generation circuit 2b generates high-frequency power with communication frequency F (=F0) according to a frequency instruction from the control circuit 2a. The high-frequency power generation circuit 2b outputs the high-frequency power to the twisted wire 4 via the matching circuit 2e. The master 2 thereby transmits the high-frequency power to the slaves 3A through 3Z (S2). The master 2 transitions to the adjustment mode (S3) when the master 2 outputs the high-frequency power first time after the startup. The master 2 awaits a response signal from the slaves 3A through 3Z.

On the other hand, after the slave 3A is activated (S101), the slave 3A receives the high-frequency power output from the master 2 (S102). The slave 3A transitions to the adjustment mode (S103). In the adjustment mode, the slave 3A allows the power monitor circuit 3g to determine whether received power P is greater than or equal to a predetermined level Pb (S104). The slave 3A transitions to the normal mode (S105) if received power P is greater than or equal to the predetermined level Pb. The slave 3A transmits ACK to the master 2 (S106).

The master 2 receives ACK from the slaves 3A through 3Z (YES at 54). The master terminates the adjustment mode and transitions to the normal mode (S5). In the normal mode, the master 2 performs the normal power line communication with the slaves 3A through 3Z using the frequency and the output power specified in the adjustment mode.

At S104, it may be determined that received power P is less than the predetermined level Pb. In such a case, the slaves 3A through 3Z check for matching count m1 and branch processes according to the count result. For example, the slaves 3A through 3Z determine whether matching count m1 is greater than or equal to a predetermined count M1 (S107).

Matching count m1 signifies the number of times the matching circuit 3e performs a matching process on the aperture antenna 3h under control of the control circuit 3a. The control circuit 3a stores this count. Because no impedance matching may occur when the slaves 3A through 3Z enter the adjustment mode for the first time, received power P for the slaves 3A through 3Z may decrease.

In such a case, received power P may be less than the predetermined level Pb. However, the slaves 3A through 3Z can gradually increase the received power by performing the matching process (S108) and stepwise adjusting a capacitance value of the variable capacitor 3i.

When the received power P is greater than or equal to the predetermined level Pb (YES at S104) according to the matching adjustment performed by the matching circuit 3e, the control circuit 3a transitions to the normal mode (S105) and transmits ACK (S106). However, the matching process performed by the matching circuit 3e just fine adjusts communication frequencies and is subject to limitations on the adjustment. Therefore, when the matching count m1 is greater than or equal to the predetermined count M1 (YES at S107), the matching-based frequency adjustment terminates.

In such a case, the control circuit 3a of the slave 3A determines whether matching count m1 is greater than or equal to the predetermined count M1 after termination of the matching-based frequency adjustment (S109). If the determination result is true (YES at S109), the control circuit 3a transmits NAK (S110).

If the condition is not satisfied (NO at S109), the control circuit 3a transitions to sleep mode and waits until the master performs adjustment and the slave 3A is ready for receiving requested power. For example, the sleep mode remains active until the master 2 adjusts the impedance matching, the communication frequency, and the output power and the matching succeeds (S107) so as to satisfy the conditions of the determinations (S104 and S109) for the received power.

The slave 3A transmits NAK at S110 and the master 2 receives NAK (YES at 86). The master 2 checks for matching count m2 and branches the process according to the count result. For example, the master 2 determines whether matching count m2 is greater than or equal to a predetermined count M2 (87). If this condition is not satisfied (NO at S7), the master 2 performs the matching process (S8) by adjusting the capacitance value for the variable capacitor 2h in the matching circuit 2e of the master 2.

Similarly to the slave 3A, the master 2 also puts limitations on the matching process of the matching circuit 2e. Matching count m2 is provided with a predetermined count M2 as an upper bound. If matching count m2 is greater than or equal to the predetermined count M2 (S7), the master 2 stepwise changes communication frequency F (F1, F2, F3 . . . , and then Fn) (S9) to transmit the high-frequency power.

The process (S4, and S6 through S9) is repeated until the master 2 receives ACK. Even in the sleep mode, the sieve 3A can transition to the normal mode and restart the communication process between the master 2 and the slave 3A when received power P becomes greater than or equal to the predetermined level Pb.

According to the present embodiment, the aperture region between twits 4A and 4B of the twisted wire 4 is provided to face the aperture region of the aperture antenna 3h for each of the slaves 3A through 3Z. Therefore, the twisted wire 4 can be used to branch (distribute) the power and communicate signals.

The use of the twisted wire 4 can reduce leakage magnetic flux. Accordingly, the power and signals can be efficiently transmitted, and it is possible to efficiently perform contactless power line communication between the master 2 and each of the slaves 3A through 3Z. The master 2 can branch (distribute) the power and signals to the slaves 3A through 3Z without using the other parts such as a harness and a connector. The slave 3A includes the power supply monitor circuit 3g that measures the received power. The slave 3A restarts the normal power line communication if the result of measuring received power P becomes greater than or equal to the predetermined level Pb.

By contrast, the matching circuit 3e of the slave 3A performs the matching process if the result of measuring received power P is less than the predetermined level Pb. When matching count m1 is greater than or equal to the predetermined count M1 at the slave 3A, the slave 3A transmits NAK, and the matching circuit 2e of the master 2 performs the matching process.

When matching count m2 accumulated at the master 2 is greater than or equal to the predetermined count M2, the master 2 changes communication frequency F for the high-frequency power generation circuit 2b. These processes are repeated until the master 2 receives ACK. This can ensure the reliable communication process between the master 2 and the slave 3A. There has been described the adjustment process between the master 2 and the slave 3A. A similar process is performed between the master 2 and each of the slaves 3B through 3Z.

(Second Embodiment)

Figure 6:
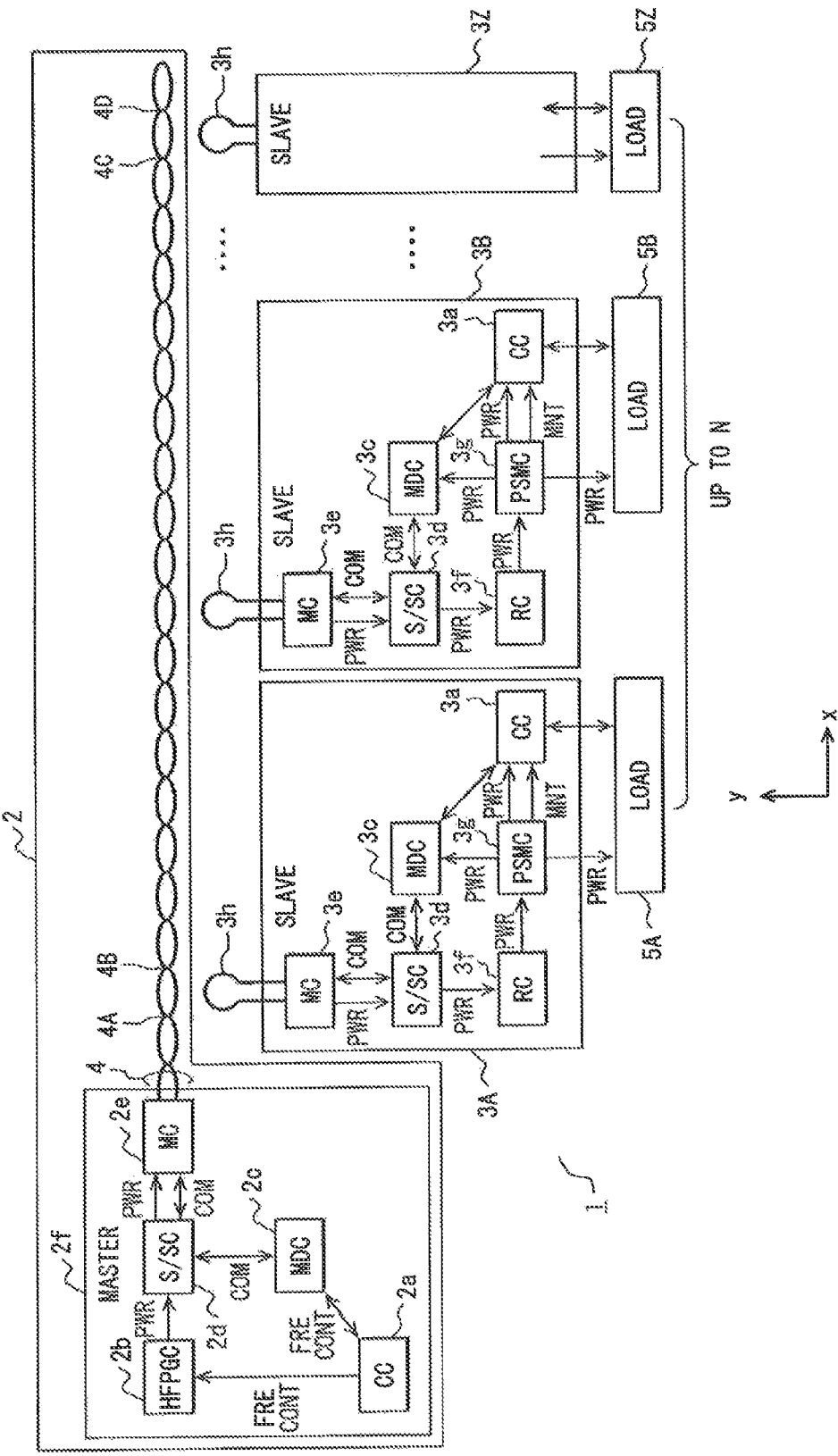
FIG. 6 is an electric configuration diagram illustrating a power line communication system according to a second embodiment of the present disclosure.

The following describes a vehicular power line communication system 1 according to the second embodiment of the present disclosure with reference to FIG. 6, FIG. 7A, and FIG. 7B. Unlike the first embodiment, the second embodiment does not perform the impedance matching control using the matching circuits 2e and 3e and controls frequencies of a high-frequency power signal generated from the high-frequency power generation circuit. The following describes differences between both embodiments. Parts or components equal to or similar to the first embodiment are depicted by the same or similar reference numerals and a description is omitted for simplicity.

As illustrated in FIG. 6, the control circuit 2a does not connect a control line to the matching circuit 2e. The control circuit 2a connects a control line to the high-frequency power generation circuit 2b to control frequencies of a power signal generated from the high-frequency power generation circuit 2b. The matching circuit 2e of the master 2 includes a fixed-capacitance capacitor instead of the variable capacitor 2h according to the first embodiment. Therefore, the matching circuit 2e matches the looped twisted pair wire 4 based on predetermined impedance and is incapable of impedance adjustment under control of the control circuit 2a.

Also in the slaves 3A through 3Z, the matching circuit 3e includes a fixed-capacitance capacitor instead of the variable capacitor 3i according to the first embodiment. Therefore, the matching circuit 3e matches the aperture antenna 3h based on predetermined impedance and is incapable of impedance adjustment under control of the control circuit 3a.

FIG. 7A is a flowchart illustrating operation of the master 2 in the adjustment mode according to the second embodiment. FIG. 7B is a flowchart illustrating operation of the slave in the adjustment mode according to the second embodiment. FIG. 7A and FIG. 7B differ from FIG. 5A and FIG. 5B in that the matching process using the matching circuit is omitted. As illustrated in FIG. 7A, the master 2 omits the matching process (S7 and S8 in FIG. 5A) according to the first embodiment and performs only a communication frequency change process (S9). As illustrated in FIG. 78, the slaves 3A through 3Z omit the matching process (S107 and S108 in FIG. 5B) according to the first embodiment.

The process according to the second embodiment determines whether a receiving electric field intensity level for the slaves 3A through 3Z is greater than or equal to the predetermined level. If the receiving electric field intensity level is less than the predetermined level, the master 2 changes communication frequency F. Thus, communication frequency F can be changed so as to be appropriate between the master 2 and each of the slaves 3A through 3Z. Compared to the first embodiment, the second embodiment need not use the control line between the control circuit 2a and the matching circuit 2e and the control line between the control circuit 3a and the matching circuit 3e. Thus, the circuit configuration can be simplified.

(Third Embodiment)

Figure 8:
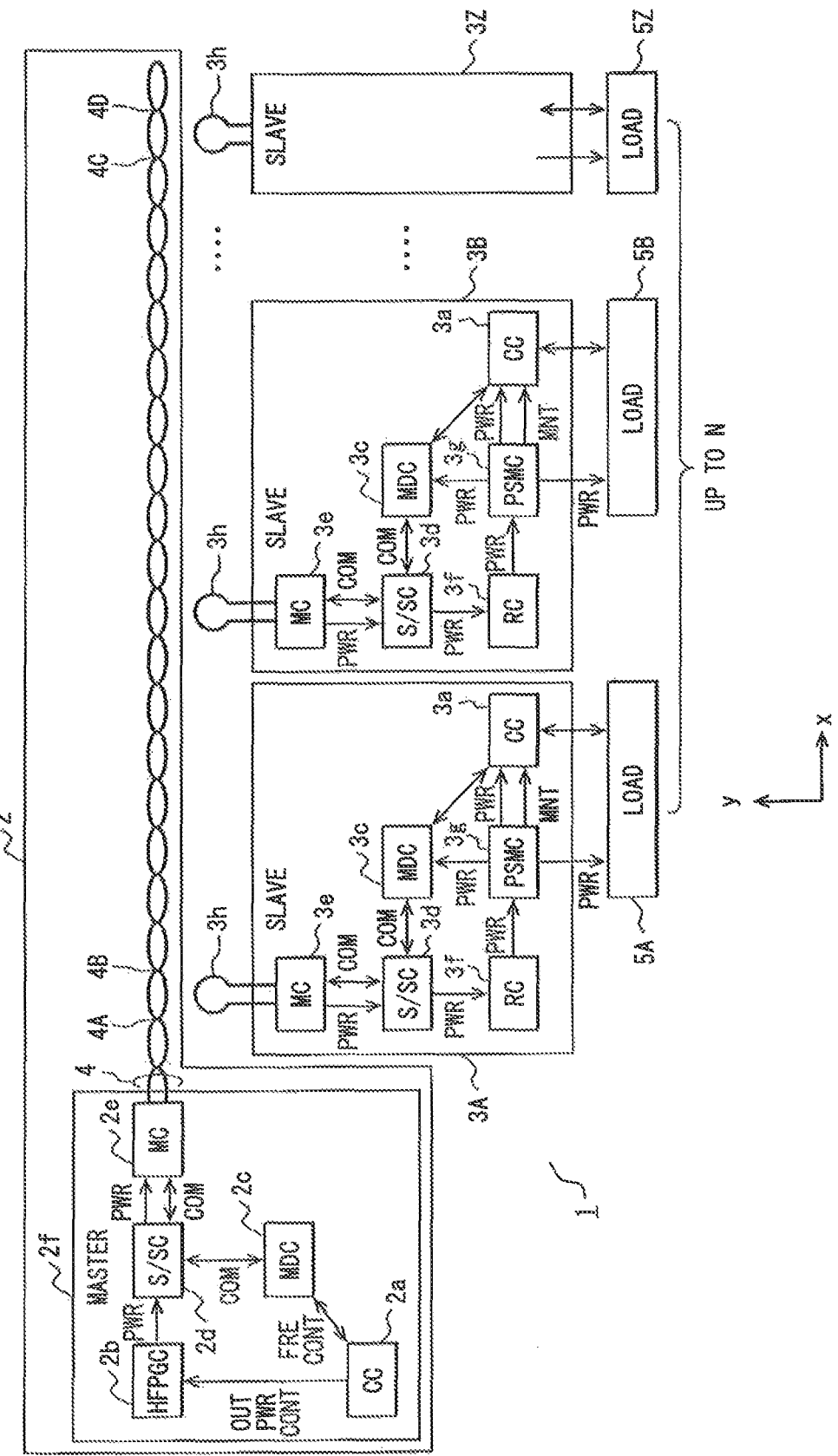
FIG. 8 is an electric configuration diagram illustrating the power line communication system according to a third embodiment of the present disclosure.
Figure 9:
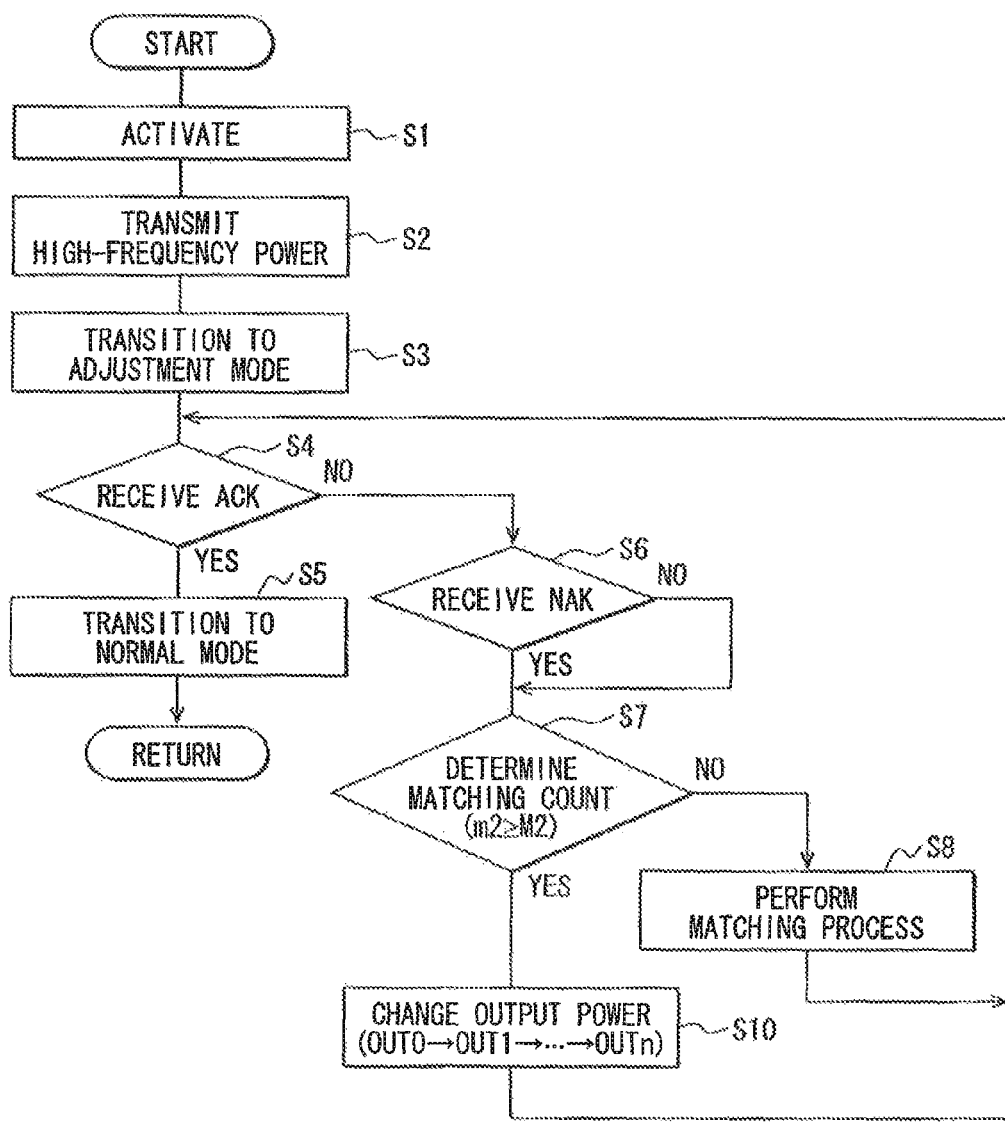
FIG. 9 is a flowchart illustrating operation of a master in adjustment mode according to the third embodiment.

The following describes a vehicular power line communication system 1 according to the third embodiment of the present disclosure with reference to FIG. 8 and FIG. 9. Unlike the above-mentioned embodiments, the third embodiment does not perform the impedance matching using the matching circuit, does not control the frequency of a high-frequency power signal generated from the high-frequency power generation circuit, and controls output power for the high-frequency power signal generated from the high-frequency power generation circuit. The following describes differences from the above-mentioned embodiments. Parts or components equal to or similar to the above-mentioned embodiments are depicted by the same or similar reference numerals and a description is omitted for simplicity.

As illustrated in FIG. 8, control circuit 2a does not connect a control lire to the matching circuit 2e and connects a control line to the high-frequency power generation circuit 2b to control output power for a power signal output from the high-frequency power generation circuit 2b.

Similarly to the second embodiment, the matching circuit 2e of the master 2 includes a fixed-capacitance capacitor instead of the variable capacitor 2h according to the first embodiment. Therefore, the matching circuit 2e matches the looped twisted wire 4 based on predetermined impedance and is incapable of impedance adjustment under control of the control circuit 2a.

Also in the slaves 3A through 3Z, the matching circuit 3e includes a fixed-capacitance capacitor instead of the variable capacitor 3i according to the first embodiment. Therefore, the matching circuit 3e matches the aperture antenna 3h based on predetermined impedance and is incapable of impedance adjustment under control of the control circuit 3a.

FIG. 9 is a flowchart illustrating operation of the master in the adjustment mode according to the third embodiment. FIG. 9 differs from FIG. 5A in that S10 in FIG. 9 changes (increases) output power while S9 in FIG. 5A changes communication frequency F. The reception power level for the slaves 3A through 3Z may indicate an unacceptable determination result even if the matching process at S7 and 58 in FIG. 9 performs impedance matching. In such a case, the master stepwise changes the output power (OUT0, OUT1, . . . , and then OUTn) at S10 in FIG. 9.

The process according to the present embodiment determines whether the receiving electric field intensity level for the slaves 3A through 3Z is greater than or equal to the predetermined level. If the receiving electric field intensity level is less than the predetermined value, the master 2 changes the output power. Accordingly, the slaves 3A through 3Z can operate reliably. Compared to the first embodiment, the third embodiment need not use the control line between the control circuit 2a and the matching circuit 2a and the control line between the control circuit 3a and the matching circuit 3e. Thus, the circuit configuration can be simplified.

(Fourth Embodiment)

Figure 10:
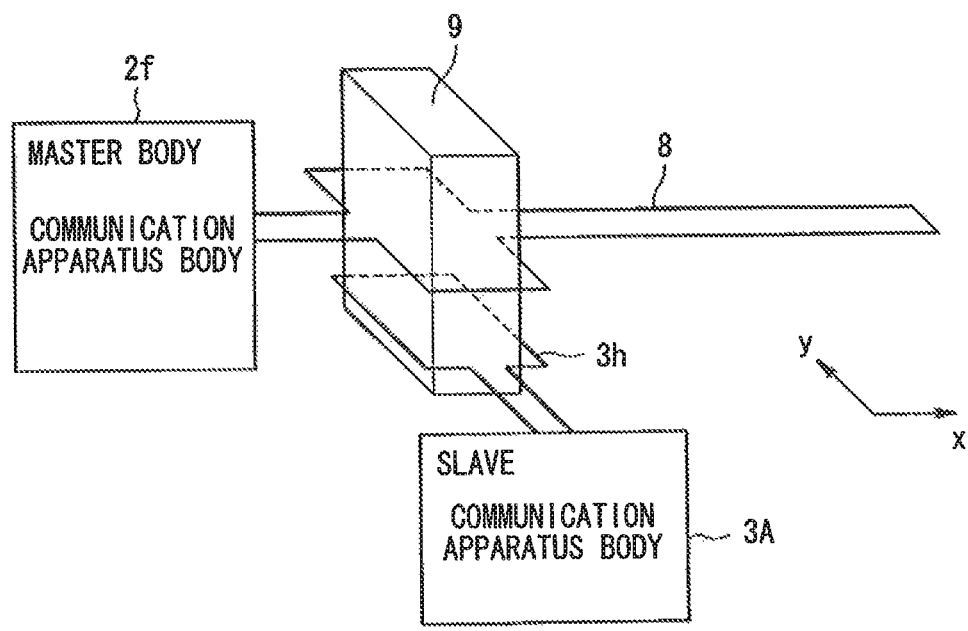
FIG. 10 illustrates electromagnetic induction coupling relationship between a master and a slave according to a fourth embodiment of the present disclosure.

The following describes a vehicular power line communication system 1 according to a fourth embodiment of the present disclosure with reference to FIG. 10. Unlike the above-mentioned embodiments, the fourth embodiment uses a loop coil at which end cores are connected so that a twisted pair wire includes no twisted portion at the end. The loop coil has an aperture region that faces an aperture region of the aperture antenna for the slave and is formed to be larger than the other apertures. The following describes differences from the above-mentioned embodiments. Parts or components equal to or similar to the above-mentioned embodiments are depicted by the same or similar reference numerals and a description is omitted for simplicity.

As illustrated in FIG. 10, the loop coil 8 linearly extends in a predetermined direction (x direction) from the communication apparatus body 2f of the master 2. The loop coil 8 is formed as a loop to connect cores at the end in the predetermined direction. In other words, the loop coil 8 does not have the twists 4A through 4D for the twisted wire 4 according to the above-mentioned embodiments. The loop coil 8 is structured so that only in the region facing the aperture antenna 3h for reception, a gap between the cores is enlarged in the width direction (y direction).

The communication apparatus body 2f transmits the power and signals superposed on the high-frequency signal to the loop coil 8. The loop coil 8 generates an electromagnetic field according to an applied current. Using the looped aperture antenna 3h, the slaves 3A through 3Z (3B through 3Z not shown) receive a carrier signal (power and signals) from the loop coil 8 according to the electromagnetic induction coupling.

The electromagnetic induction coupling can be improved because the loop coil 8 is structured so that a gap between the cores is enlarged in the width direction (y direction) only in the region facing the aperture antenna 3h for reception. As illustrated in FIG. 8, a ferrite core 9 may or may not be provided between the enlarged aperture region of the loop coil 8 and the aperture region of the aperture antenna 3h.

According to the present embodiment, the loop coil 8 is used for the power line communication. The loop coil 8 has an aperture region that faces an aperture region of the aperture antenna 3h for the slaves 3A through 3Z and is formed to be larger than the other apertures. Similarly to the above-mentioned embodiments, the fourth embodiment can improve the electromagnetic induction coupling between the master 2 and each of the slaves 3A through 3Z.

(Other Embodiments)

The present disclosure is not limited to the embodiments described above or illustrated in the accompanying drawings but may be otherwise modified or enhanced as follows. The core 9 described in the fourth embodiment may be inserted between the aperture region of the aperture antenna 3h and the aperture region between the twists 4A and 4B of the twisted wire 4 according to the first and second embodiments.

FIG. 1, FIG. 6, and FIG. 8 according to the above-mentioned embodiments illustrate that the aperture region of the aperture antenna 3h faces the aperture region (between twists 4A and 4B of the twisted wire 4) of the twisted wire 4 only in the x direction in order to easily understand the configuration of the twists 4A, 4B . . . , 4C, and 4D of the twisted wire 4. Actually, both aperture regions face to each other also in the y direction so that they overlap with each other.

The second embodiment describes the control over the frequency of the high-frequency power generation circuit 2b. The third embodiment describes the control over the output power from the same. In addition, the first embodiment describes the control over impedance matching of the matching circuit 2e for the master 2 and the control over impedance matching of the matching circuit 3e for the slaves 3A through 3Z.

The present disclosure is not limited thereto. For example, it may be favorable to control impedance matching of only the matching circuit 2e for the master 2, impedance matching of only the matching circuit 3e for the slaves 3A through 3Z, or impedance matching of the matching circuit 2e for the master 2 and the matching circuit 3e for the slaves 3A through 3Z. Accordingly, the circuit configuration can be simplified. Controlling impedance matching of only the matching circuit 2e for the master 2 can deal with characteristic variations due to installation positions of the slaves 3A through 3Z.

It may be favorable to combine two or more of the frequency control over the high-frequency power generation circuit 2b (second embodiment), the output power control over the high-frequency power generation circuit 2b (third embodiment), and the impedance matching control over the matching circuit 2e for the master 2.

What is claimed is:

1. A vehicular power line communication (PLC) system comprising:
   a loop-formed twisted pair wire at which end a core is connected;
   a master configured to use the twisted pair wire as a power line and a communication line and configured to output a high-frequency signal to the twisted pair wire to transmit power and a signal; and
   a slave including a looped aperture antenna configured to receive high-frequency power of the twisted pair wire through electromagnetic induction coupling of an electromagnetic field occurring at the twisted pair wire in accordance with an applied current of the twisted pair wire and a received power measurement portion that monitors received power received at the aperture antenna, wherein the aperture antenna includes an aperture region facing an aperture region between a plurality of twisted portions of the twisted pair wire, wherein the master and the slave are configured to operate in an adjustment mode that adjusts power line communication at a communication rate lower than a normal rate before starting normal power line communication, wherein when the master outputs the high-frequency signal, the slave is configured to receive the high-frequency signal and allows the received power measurement portion to measure a reception power level, wherein the communication system is configured such that when a measurement result is greater than or equal to a predetermined level, normal power line communication starts between the master and the slave, and wherein the slave further includes a superposition/separation circuit configured to receive the high-frequency signal from the master, and to separate the received high-frequency signal into a power signal and a communication data signal.

2. The vehicular PLC system according to claim 1,
wherein the twisted pair wire is configured so that the aperture region between the twisted portions that faces the aperture region of the aperture antenna is larger than other aperture regions.

3. The vehicular PLC system according to claim 1,
wherein the master includes a frequency control portion configured to control a transmission frequency of the high-frequency signal.

4. The vehicular PLC system according to claim 1,
wherein the master includes an output power control portion configured to control output power for the high-frequency signal.

5. The vehicular PLC system according to claim 1,
wherein the master and the slave includes a matching portion configured to provide impedance matching for the aperture antenna.

6. The vehicular PLC system according to claim 1,
wherein the master and the slave includes a matching portion configured to provide impedance matching for the aperture antenna;
wherein, when the master outputs the high-frequency signal, the slave is configured to receive the high-frequency signal and is configured to allow the received power measurement portion to measure a reception power level; and
wherein, when a measurement result is less than a predetermined level, the slave is configured to allow the matching portion to provide matching.

7. The vehicular PLC system according to claim 1,
wherein the master includes a frequency control portion configured to control a communication frequency of the high-frequency signal;
wherein, when the master outputs the high-frequency signal, the slave is configured to receive the high-frequency signal and is configured to allow the received power measurement portion to measure a reception power level; and
wherein, when a measurement result is less than a predetermined level, the master is configured to allow the frequency control portion to adjust the communication frequency of the high-frequency signal.

8. The vehicular PLC system according to claim 1,
wherein the master includes an output power control portion configured to control output power for the high-frequency signal;
wherein, when the master outputs the high-frequency signal, the slave is configured to receive the high-frequency signal and is configured to allow the received power measurement portion to measure a reception power level; and
wherein, when a measurement result is lower than a predetermined level, the master is configured to allow the output power control portion to increase the output power for the high-frequency signal.

9. The vehicular PLC system according to claim 1, wherein the slave further includes a power supply monitoring circuit configured to perform power supply to a load, and the power supply monitoring circuit is configured to cut the power supply to the load in the adjustment mode.

10. A vehicular power line communication (PLC) system comprising:
a loop coil;
a master configured to use the loop coil as a power line and a communication line and outputs a high-frequency signal to the loop coil to transmit power and a signal; and
a slave including a looped aperture antenna configured to receive high-frequency power of the loop coil through electromagnetic induction coupling of an electromagnetic field occurring at the loop coil in accordance with an applied current of the loop coil and a received power measurement portion that monitors received power received at the aperture antenna,
wherein the loop coil is configured so that an aperture region facing an aperture region of the aperture antenna is larger than other aperture regions,
wherein the master and the slave are configured to operate in an adjustment mode that adjusts power line communication at a communication rate lower than a normal rate before starting normal power line communication,
wherein when the master outputs the high-frequency signal, the slave is configured to receive the high-frequency signal and allows the received power measurement portion to measure a reception power level,
wherein the communication system is configured such that when a measurement result is greater than or equal to a predetermined level, normal power line communication starts between the master and the slave, and
wherein the slave further includes a superposition/separation circuit configured to receive the high-frequency signal from the master, and to separate the received high-frequency signal into a power signal and a communication data signal.

11. The vehicular PLC system according to claim 10, wherein
the slave further includes a power supply monitoring circuit configured to perform power supply to a load, and
the power supply monitoring circuit is configured to cut the power supply to the load in the adjustment mode.

\* \* \* \* \*